US011310688B2

United States Patent
Onishi

(10) Patent No.: US 11,310,688 B2
(45) Date of Patent: Apr. 19, 2022

(54) INFORMATION PRESENTING DEVICE, INFORMATION PRESENTING METHOD AND RECORDING MEDIUM

(71) Applicant: NEC Corporation, Tokyo (JP)

(72) Inventor: Takeo Onishi, Tokyo (JP)

(73) Assignee: NEC CORPORATION, Tokyo (JP)

(*) Notice: Subject to any disclaimer, the term of this patent is extended or adjusted under 35 U.S.C. 154(b) by 441 days.

(21) Appl. No.: 16/300,615

(22) PCT Filed: May 15, 2017

(86) PCT No.: PCT/JP2017/018160
§ 371 (c)(1),
(2) Date: Nov. 12, 2018

(87) PCT Pub. No.: WO2017/199899
PCT Pub. Date: Nov. 23, 2017

(65) Prior Publication Data
US 2020/0314680 A1 Oct. 1, 2020

(30) Foreign Application Priority Data
May 19, 2016 (JP) .............................. JP2016-100411

(51) Int. Cl.
*H04W 28/02* (2009.01)
*H04W 24/08* (2009.01)

(52) U.S. Cl.
CPC ....... *H04W 28/0236* (2013.01); *H04W 24/08* (2013.01); *H04W 28/0226* (2013.01)

(58) Field of Classification Search
CPC ............. H04W 28/0236; H04W 24/08; H04W 28/0226; H04W 28/06; G01C 21/3697;
(Continued)

(56) References Cited

U.S. PATENT DOCUMENTS

2012/0042726 A1* 2/2012 Jeon ..................... G01C 22/006
73/490
2014/0105016 A1* 4/2014 Tsuda .................... H04W 28/06
370/230.1
(Continued)

FOREIGN PATENT DOCUMENTS

JP 2006-186475 A 7/2006
JP 2008-42628 A 2/2008
(Continued)

OTHER PUBLICATIONS

"Android (registered trademark) Developers", [online], [retrieved on Nov. 12, 2018], Internet <URL:http://developer.android.com/intl/ja/guide/topics/ui/notifiers/notifications.html>, 27 pages.
(Continued)

*Primary Examiner* — Ayaz R Sheikh
*Assistant Examiner* — Louis Samara
(74) *Attorney, Agent, or Firm* — Sughrue Mion, PLLC

(57) ABSTRACT

To provide information processing devices capable of effectively presenting to a user an action that improves communication quality. The information presenting devices includes: a communication quality acquisition means that acquires current communication quality and communication quality when a user takes an action; an action cost calculation means that calculates a cost of the action; a presentation information calculating means that determines the action, based on the current communication quality, the communication quality when the action is taken, and the action cost; a first presenting means that displays predetermined information about a case where the action is taken; and a second presenting means that acquires an instruction from a user after display by the first presenting means, and then also displays additional information about a case where the action is taken, in addition to the predetermined information.

18 Claims, 9 Drawing Sheets

(58) Field of Classification Search
CPC .. G01C 22/006; G06Q 40/06; G06F 12/0862; G06F 11/36; H04L 61/2007
See application file for complete search history.

(56) References Cited

U.S. PATENT DOCUMENTS

| | | | | |
|---|---|---|---|---|
| 2014/0161011 A1* | 6/2014 | Hara | ................... | H04L 61/2007 370/311 |
| 2014/0234819 A1 | 8/2014 | Tanaka et al. | | |
| 2015/0139114 A1* | 5/2015 | Uchino | ................ | H04W 24/08 370/329 |
| 2016/0345134 A1* | 11/2016 | Tsuda | ................. | G01C 21/3697 |
| 2018/0024985 A1* | 1/2018 | Asano | ..................... | G06F 40/20 704/275 |

FOREIGN PATENT DOCUMENTS

| | | | | | |
|---|---|---|---|---|---|
| JP | 2008042628 | A | * | 2/2008 | |
| JP | 2011-61299 | A | | 3/2011 | |
| JP | 2013070353 | A | * | 4/2013 | |
| JP | 2014174485 | A | * | 9/2014 | |
| JP | 5822298 | B2 | * | 11/2015 | |
| KR | 20060023822 | A | * | 3/2006 | |
| WO | 2012/157496 | A1 | | 11/2012 | |
| WO | 2012/167058 | A1 | | 12/2012 | |
| WO | WO-2012167058 | A1 | * | 12/2012 | ............. G06Q 40/06 |
| WO | WO-2012176924 | A1 | * | 12/2012 | ......... G06F 12/0862 |
| WO | 2014/007009 | A1 | | 1/2014 | |

OTHER PUBLICATIONS

International Search Report dated Aug. 1, 2017, issued by the International Searching Authority in PCT/JP2017/018160.
Written Opinion dated Aug. 1, 2017, issued by the International Searching Authority in PCT/JP2017/018160.

* cited by examiner

| POSITION | RADIO WAVE INTENSITY (dBm) |
|---|---|
| 35.681624,139.764841 | −103 |
| 35.682748,139.763736 | −91 |
| 35.682713,139.759774 | −85 |
| ⋮ | ⋮ |

| POSITION | RADIO WAVE INTENSITY (dBm) | MOVEMENT DISTANCE (m) |
|---|---|---|
| 35.681624,139.764841 | −103 | 0 |
| 35.682748,139.763736 | −91 | 160 |
| 35.682713,139.759774 | −85 | 474 |
| ⋮ | ⋮ | ⋮ |

# INFORMATION PRESENTING DEVICE, INFORMATION PRESENTING METHOD AND RECORDING MEDIUM

This application is a National Stage Entry of PCT/JP2017/018160 filed on May 15, 2017, which claims priority from Japanese Patent Application 2016-100411 filed on May 19, 2016, the contents of all of which are incorporated herein by reference, in their entirety.

TECHNICAL FIELD

The present invention relates to an information presenting device, an information presenting method, and a recording medium. Particularly, the present invention relates to a technique of presenting, by a portable information processing device, information related to communication quality to a user of the information processing device.

BACKGROUND ART

In a portable information processing device, such as a smartphone, utilizing a mobile communication network (hereinafter, simply referred to as a "mobile network"), deterioration of communication quality may be caused by a decrease of receiving radio wave intensity and congestion of a mobile network.

Such deterioration of communication quality may be lessened by movement of a user of the information processing device. For example, a user can obtain a good communication quality by moving from a place at low receiving radio wave intensity to a place at high receiving radio wave intensity. Therefore, for a user who wants to enjoy a good communication quality, it is important to know beforehand how communication quality changes due to an action (e.g., movement from one place to another) taken by the user of the information processing device himself/herself.

For example, PTL 1 discloses a method of determining a position where communication quality can be improved, based on time-series data about a communication quality, and presenting the position to a user. According to the technique, a user of the information processing device is able to know a position where communication quality will be improved. Therefore, the user can improve communication quality by moving to the presented position. PTL 2 discloses a method by which a user of an information processing device knows a current communication quality by a small image which is called an antenna pictogram, and displayed on an upper part of a screen of the information processing device.

Furthermore, NPL 1 discloses that information is presented to a user of an information processing device by using a notification method called a heads-up notification. According to the methods disclosed by PTL 1 and NPL 1, when a position where communication quality will be improved exists, it is possible to notify of the position where communication quality will be improved.

CITATION LIST

Patent Literature

[PTL 1]
Japanese Unexamined Patent Application Publication No. 2014-17558
[PTL 2]
International Publication No. WO2014/007009

Non Patent Literature

[NPL 1]
"Android (registered trademark) Developers", [online], [retrieved on May 19, 2016], Internet <URL: http://developer.android.com/intl/ja/guide/topics/ui/notifiers/notifications.ht m1>

SUMMARY OF INVENTION

Technical Problem

According to the technique described above, a user of an information processing device is able to know an action necessary to improve a communication quality. In other words, a user is able to improve communication quality by taking an appropriate action based on the presented information. However, with this technique, there is a possibility that a user is not able to effectively refer to information necessary to improve a communication quality. The reason is described below in detail.

Generally, in the case where a user refers to information, the user himself/herself checks information when necessary. For example, when a user feels that communication quality is poor, the user starts an application program with which an action that improves communication quality can be checked.

However, when a presented action serving to improve communication quality needs considerable time and labor (e.g. moving several kilometers), a user does not adopt the presented action. Further, when a degree of that improves communication quality is limited, the user does not adopt the presented action either. In this case, the user has referred to information wastefully.

Furthermore, when a user refers to information, and does not adopt a presented action repeatedly, there is a possibility that the user gives up referring to information (e.g., gives up using an application program with which an action that improves communication quality can be checked).

Instead of voluntary reference to information by a user, it is also possible to voluntarily present an action improving a communication quality from the information processing device side. However, according to the method in PTL 2, information is presented in a small image. Therefore, it is difficult to present details of an action improving a communication quality.

According to the method in NPL 1, it is possible to present details of an action improving a communication quality. However, a user does not necessarily need a communication quality to be improved. For example, when a user of an information processing device is using an application program, such as e-mail or chat, that is low in communication amount, a good communication quality is not much needed. When a notification as disclosed in PTL 1 and NPL 1 frequently occurs in such cases of a small effect of improvement, much labor for improvement, low necessity for improvement, and the like, there is concern that a part of a screen of the information processing device is hidden by the notification, and use of the information processing device by a user is prevented.

The present invention has been made in view of the problem described above, and is intended to provide a portable information processing device and the like which effectively present an action improving a communication quality to a user.

Solution to Problem

Information presenting devices of the present invention includes: a communication quality acquisition means that acquires current communication quality and communication quality when a user takes an action; an action cost calculation means that calculates a cost of the action; a presentation information calculating means that determines the action, based on the current communication quality, the communication quality when the action is taken, and the action cost; a first presenting means that displays predetermined information about a case where the action is taken; and a second presenting means that acquires an instruction from a user after display by the first presenting means, and then also displays additional information about a case where the action is taken, in addition to the predetermined information.

Information presenting method of the present invention includes: acquiring current communication quality and communication quality when a user takes an action; calculating a cost of the action; determining the action, based on the current communication quality, the communication quality when the action is taken, and the action cost; displaying predetermined information about a case where the action is taken; and acquiring an instruction from a user after display of the predetermined information, and then also displaying additional information about a case where the action is taken, in addition to the predetermined information.

Information presenting program causing a computer to execute: communication quality acquisition processing of acquiring current communication quality and the communication quality when a user takes an action; action cost calculation processing of calculating a cost of the action; presentation information calculating processing of determining the action, based on the current communication quality, the communication quality when the action is taken, and the action cost; first presenting processing of displaying predetermined information about a case where the action is taken; and second presenting processing of acquiring an instruction from a user after display of the predetermined information, and then also displaying additional information about a case where the action is taken, in addition to the predetermined information.

The program may be included in a non-transitory recording medium.

Advantageous Effects of Invention

Portable information processing devices according to the present invention are capable of effectively presenting to a user an action that improves communication quality.

EXAMPLE EMBODIMENT

Hereinafter, embodiments of the present invention will be described in detail with reference to the drawings.

First Example Embodiment

Figures 1, 2:
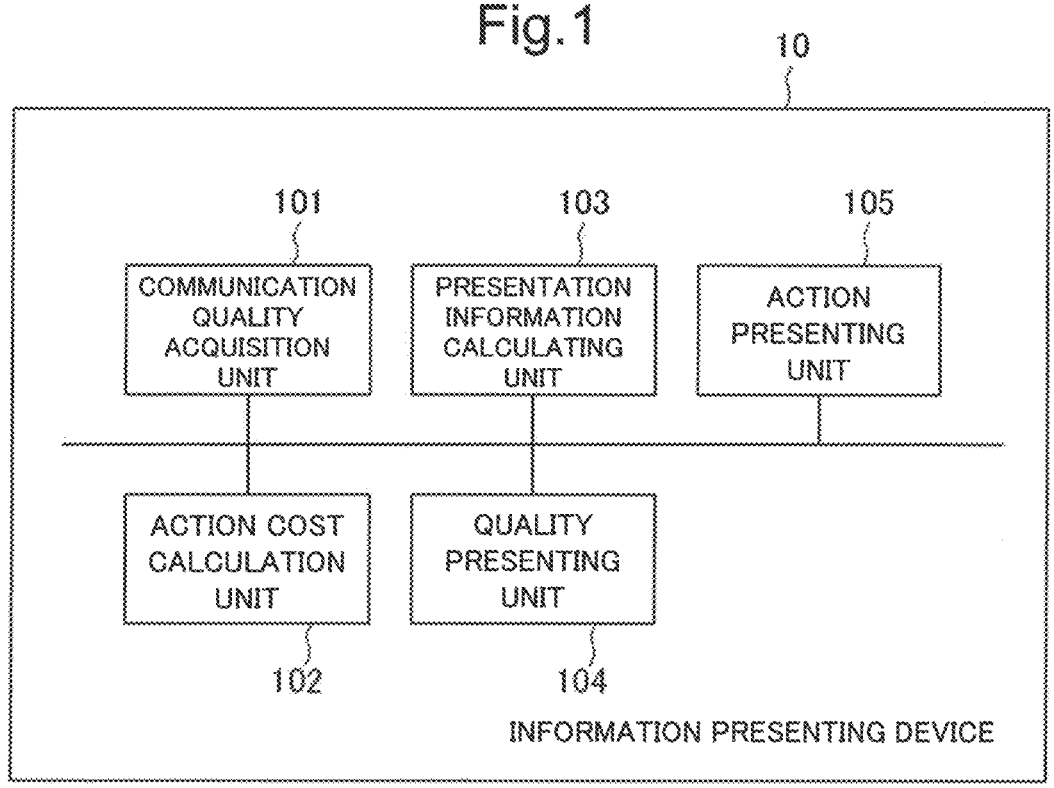
FIG. 1 is a block diagram illustrating one example of a configuration of an information presenting device according to a first example embodiment of the present invention.
FIG. 2 is a diagram illustrating one example of communication quality information generated by a communication quality acquisition unit.

FIG. 1 is a block diagram illustrating a configuration of information presenting device 10 according to a first example embodiment. Information presenting device 10 according to the first example embodiment is a portable information processing device. Information presenting device 10 includes communication quality acquisition unit 101, action cost calculation unit 102, presentation information calculating unit 103, quality presenting unit 104, and action presenting unit 105. Hereinafter, components of information presenting device 10 are described in detail.

Note that information presenting device 10 also includes components that are typically included in a portable information processing device such as a tablet terminal device, a smartphone, or a mobile phone. Such a component is, for example, a processor and an operating system which execute an application program (hereinafter, abbreviated as an "application"). However, herein, descriptions thereof are omitted.

Communication quality acquisition unit 101 acquires communication qualities of information presenting device 10 for a current position and each of one or more other positions, and generates communication quality information. The communication quality information includes at least a position, and a communication quality at the position. A position may be, for example, a latitude/longitude, or an address. A communication quality may be, for example, radio wave intensity received by information presenting device 10 from a base station of a mobile network, a degree of congestion of a base station, or a throughput of a data communication with a communication device disposed on a network.

FIG. 2 is a diagram illustrating one example of communication quality information generated by communication quality acquisition unit 101 according to the first example embodiment. As illustrated in FIG. 2, the communication quality information is a table in which a pair of a position and radio wave intensity as a communication quality are in one row. In the communication quality information example in FIG. 2, a position indicates a latitude and a longitude, and a communication quality indicates radio wave intensity (dBm) at the position. For example, referring to a first row in FIG. 2, a position is "35.681624, 139.764841", and radio wave intensity is "−103 dBm". This indicates that radio wave intensity is −103 dBm in a position at a latitude of 35.681624 and a longitude of 139.764841. Other rows indicate radio wave intensity at particular positions in a similar manner.

For example, communication quality acquisition unit 101 directly measures and thus acquires a communication quality at the current position. As one example, communication quality acquisition unit 101 acquires a current position by a global positioning system (GPS). Moreover, communication quality acquisition unit 101 measures radio wave intensity from a base station to which information presenting device 10 is connected.

As a communication quality at another position, communication quality acquisition unit 101 uses, for example, a communication quality measured by information presenting device 10 in the past. Alternatively, communication quality acquisition unit 101 may acquire from a server, which is disposed on a network, recording communication quality information at each position. By acquiring from the server, it is possible to acquire a communication quality at a position which information presenting device 10 has never visited in the past.

Action cost calculation unit 102 calculates a cost (action cost) related to an action taken by a user of information presenting device 10. In the case described in the present example, an action cost is a distance of a movement. Note that the distance is one example only, and an action cost may be, for example, time necessary for a movement. In the present example, action cost calculation unit 102 calculates an action cost when movement is made to each position, based on the position in the quality information acquired by communication quality acquisition unit 101.

Figures 3, 4:
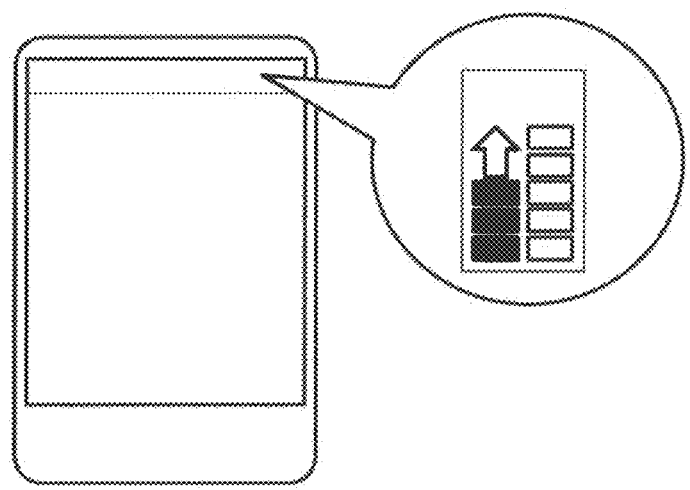
FIG. 3 is a diagram illustrating one example of an action cost calculated by an action cost calculation unit.
FIG. 4 is a view illustrating one example of quality improvement information presented by a quality presenting unit.

FIG. 3 is a diagram illustrating one example of an action cost calculated by action cost calculation unit 102. As illustrated in FIG. 3, action cost calculation unit 102 calculates a movement distance from the current position of information presenting device 10 as an action cost, for each position acquired by communication quality acquisition unit 101. For example, referring to the second row in FIG. 2, a position is "35.682748, 139.763736". When the current position of information presenting device 10 is "35.681624, 139.764841" indicated in the first row in FIG. 3, an action cost (herein, a movement distance) for the position described in the second row in FIG. 2 is calculated as 160 m which is a distance between the two positions.

Based on the communication quality information and a communication quality obtained by an action that improves a communication quality, which are acquired by communication quality acquisition unit 101, and the action cost calculated by action cost calculation unit 102, presentation information calculating unit 103 calculates information (action information) related to an action that improves a communication quality, which is presented by quality presenting unit 104 and action presenting unit 105. One example of a method by which presentation information calculating unit 103 calculates action information is described below.

First, a threshold (hereinafter, described as a quality threshold) regarding a communication quality is set in presentation information calculating unit 103. When a current communication quality of information presenting device 10 is equal to or more than the quality threshold, presentation information calculating unit 103 does not calculate action information. In the present example, it is assumed that radio wave intensity (dBm) is used as a quality threshold, and "−100 dBm" is set as a threshold of radio wave intensity. For example, when the current radio wave intensity acquired by communication quality acquisition unit 101 is "−95 dBm", the current communication quality is better than the quality threshold. Thus, presentation information calculating unit 103 does not calculate action information. Therefore, information presenting device 10 does not perform presentation related to an action that improves a communication quality. In this way, it is possible to suppress a notification of action information unnecessary for a user of information presenting device 10 when a communication quality sufficient for use of an application has been already obtained.

On the other hand, when the current radio wave intensity acquired by communication quality acquisition unit 101 is "−103 dBm", presentation information calculating unit 103 determines that the communication quality is lower than the quality threshold. In this case, based on the communication quality information acquired by communication quality acquisition unit 101, presentation information calculating unit 103 determines whether there exists a position where the communication quality is equal to or more than the quality threshold, and at the same time, where the action cost is less than or equal to a predetermined value (action cost threshold). Note that, in the present example, it is assumed that the action cost threshold represents a distance, and is, for example, 300 m.

Referring to FIG. 3, a position "35.682748, 139.763736" described in the second row satisfies the condition. When a position satisfying the condition exists, presentation information calculating unit 103 selects one of positions satisfying the condition, and then specifies, as an action that improves a communication quality, moving to the selected position. A position to be selected is, for example, a position satisfying the quality threshold and the action cost threshold and having the best communication quality. According to the example of FIG. 3, the position "35.682748, 139.763736" is a position being less than or equal to the action cost threshold and having the best communication quality. Therefore, the action information calculated by presentation information calculating unit 103 is specified as moving to the position "35.682748, 139.763736". In other words, an action of moving to the position with the action cost "160 m", and thus improving the current communication quality "−103 dBm" to "−91 dBm" is specified.

On the other hand, when no position satisfying the action cost threshold exists, a sufficient communication quality can not be ensured by moving. Therefore, presentation information calculating unit 103 does not calculate action information.

In this way, presentation information calculating unit 103 determines based on the quality threshold and the action cost threshold. Thereby, action information is calculated only when a necessary communication quality can be ensured by taking a presented action, and a cost of the presented action is low. In this case alone, information presenting device 10 presents action information, and can therefore accurately present information to a user of information presenting device 10. Note that presentation information calculating unit 103 may determine that present action information not to be presented even when a communication quality necessary for an application can be obtained by taking a presented action and a cost of the presented action is low if an improvement rate of a communication quality is an extremely low rate less than or equal to a predetermined value.

When presentation information calculating unit 103 calculates action information, quality presenting unit 104 displays a current communication quality, and a communication quality (herein, represented as quality improvement information) changed by an action that improves a communication quality, based on the calculated action information.

FIG. 4 is a view illustrating one example of quality improvement information presented by quality presenting unit 104. In FIG. 4, a current communication quality is represented by using a black square, and the communication quality changed by an action that improves a communication quality is represented by using white squares. The number of squares indicates whether a communication quality is good or poor, and a greater number of squares indicates a better communication quality. Moreover, an arrow drawn above the black square indicates, by length thereof, an improvement amount of a communication quality. In other words, an arrow indicates a greater improvement amount when length thereof is longer.

Note that the method of displaying quality improvement information by quality presenting unit 104 exhibited in the present example is one example only, and may be another method. For example, quality presenting unit 104 may represent, by numerical values such as "−103 dBm" and "−91 dBm", a current communication quality, and a communication quality (in the present example, radio wave intensity) changed by an action that improves a communication quality. Moreover, quality presenting unit 104 may indicate a value (e.g., −103 dBm) of a current communication quality, and a value of a change amount of a communication quality obtained by an action that improves a communication quality.

As above, quality presenting unit 104 displays only a current communication quality and a communication quality changed by an action that improves a communication quality, which are parts of action information. Therefore, as in the example of FIG. 4, quality presenting unit 104 can display in a small region on a screen of information presenting device 10. Thus, it is possible to suppress a disadvantage such as hiding of a part of the screen by presenting quality improvement information to a user of information presenting device 10. At the same time, by the action information displayed by quality presenting unit 104, a user of information presenting device 10 is able to know that a current communication quality is not sufficient, and that an action that can improve a communication quality exists.

When a user of information presenting device 10 who has seen the information presented by quality presenting unit 104 performs a predetermined operation, action presenting unit 105 presents action information. The predetermined operation may be, for example, an operation of tapping an image of the quality improvement information illustrated in FIG. 4, an operation of swiping the screen of information presenting device 10 from an upper part to a lower part thereof, or an operation of shaking information presenting device 10.

Note that the predetermined operation exhibited herein is one example only, and may be any operation that can be detected by information presenting device 10. The action information presented by action presenting unit 105 includes action information which presentation information calculating unit 103 has determined to present. Specifically, the action information presented by action presenting unit 105 includes, for example, a current communication quality, an improvement amount of a communication quality by improving a communication quality, and an action that improves a communication quality (e.g., a current position, and a position of a movement destination).

Figure 5:
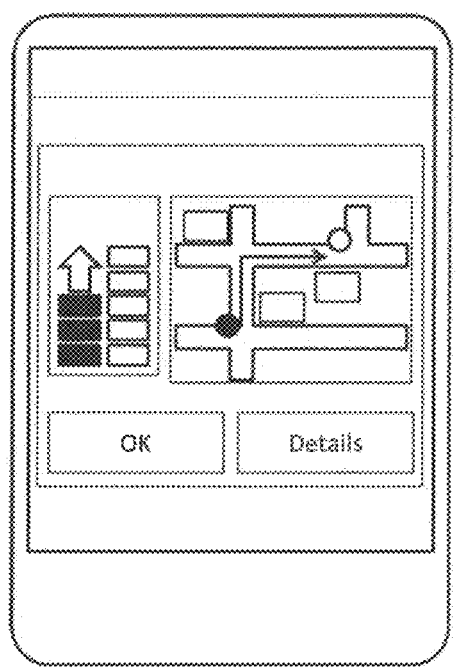
FIG. 5 is a view illustrating one example of action information presented by an action presenting unit.

FIG. 5 is a view illustrating one example of action information presented by action presenting unit 105. The quality improvement information illustrated in FIG. 4 is displayed in a left part of FIG. 5. A map is displayed in a right part of FIG. 5. A black spot indicates a current position of information presenting device 10, and a white spot indicates a position where a communication quality calculated by presentation information calculating unit 103 is improved. According to the example of FIG. 5, a user of information presenting device 10 is able to know an action (e.g., a movement to the position indicated by the white spot) that improves a communication quality and a cost of the action, by referring to the action information presented by action presenting unit 105.

Note that the method of displaying action information exhibited herein is one example only, and action presenting unit 105 may use another method. For example, action presenting unit 105 may display a movement route as represented by an arrow in FIG. 5. This enables action presenting unit 105 to present how to move in order to improve a communication quality, to a user of information presenting device 10, in a way easy to understand. Moreover, as an action cost, action presenting unit 105 may indicate a movement distance by a numerical value, or indicate time needed for a movement. This enables action presenting unit 105 to present a cost of an action necessary to improve a communication quality, to a user of information presenting device 10, in a way easy to understand.

As above, a user of information presenting device 10 performs a predetermined operation, and accordingly, action presenting unit 105 presents details of an action that improves a communication quality. In order to present detailed information, action presenting unit 105 displays by using a screen region larger than that for the quality improvement information presented by quality presenting unit 104. To this end, action presenting unit 105 hides contents displayed on the screen of information presenting device 10 before presenting action information. However, display is started in response to an operation by a user of information presenting device 10, in contrast to the quality improvement information presented by quality presenting unit 104. Therefore, it is considered that a user is interested in the action information. Thus, hiding, by the action information, the contents displayed on the screen does not prevent use of a smartphone or the like.

Figure 6:
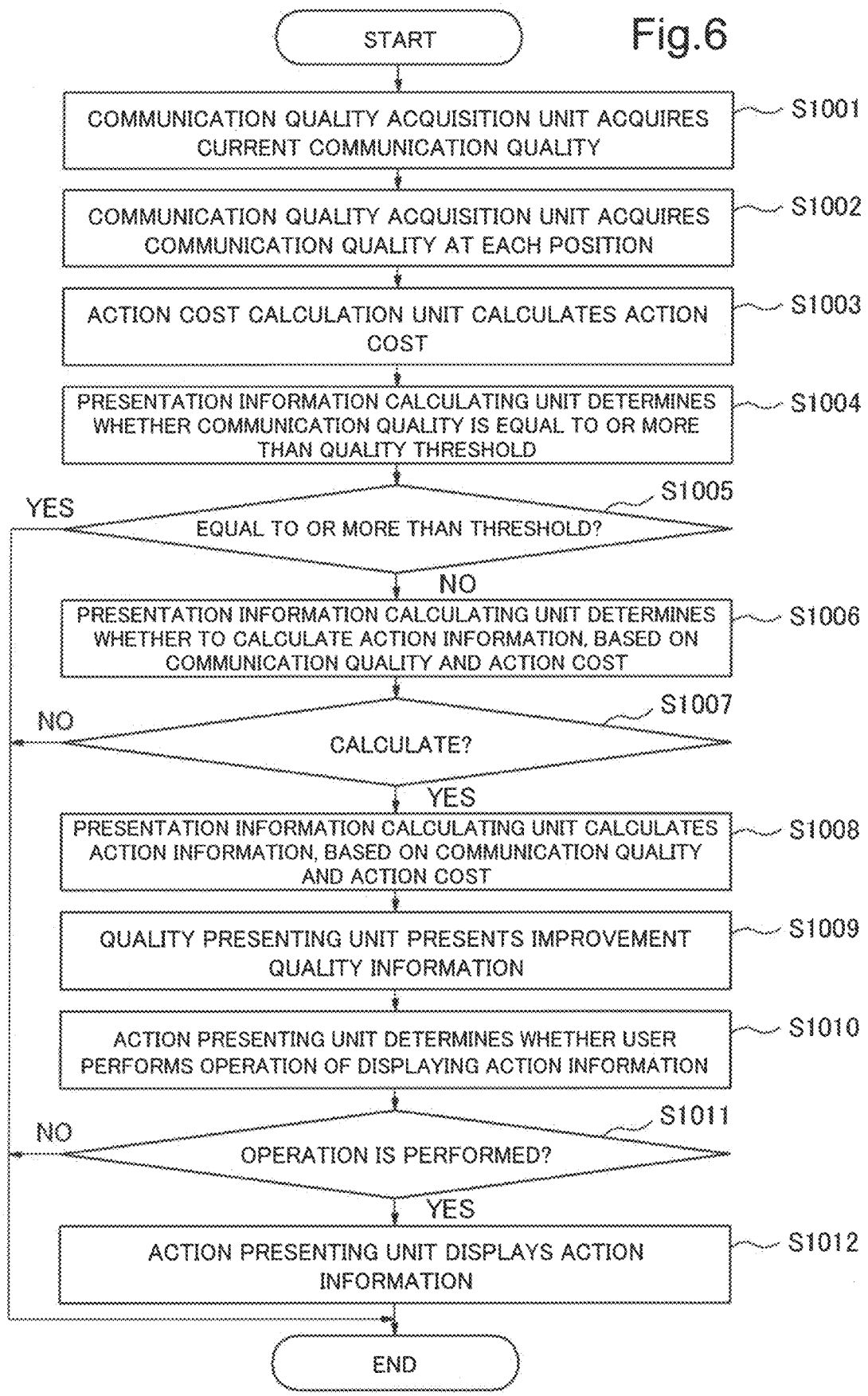
FIG. 6 is a flowchart illustrating an operation example of the information presenting device according to the first example embodiment of the present invention.

Next, an operation example of information presenting device 10 according to the first example embodiment is described with reference to a flowchart in FIG. 6.

First, communication quality acquisition unit 101 acquires a current communication quality (step S1001). Note that, in this instance, communication quality acquisition unit 101 also acquires a current position of information presenting device 10. In the present example, it is assumed that the current position and the current communication quality have values in the first row in FIG. 2. Next, communication quality acquisition unit 101 acquires a communication quality at each position other than the current position, and generates communication quality information together with the communication quality of the current position acquired in step S1001 (step S1002). In the present example, it is assumed that, for example, communication quality acquisition unit 101 generates the communication quality information illustrated in FIG. 2.

Next, action cost calculation unit 102 calculates an action cost for each position in the communication quality information generated in step S1002 (step S1003). In the present example, it is assumed that the action cost is a movement distance, and a movement distance in the case of moving from the current position to each position in the communication quality information is calculated. In the present example, it is assumed that the action cost calculated in step S1003 is as illustrated in FIG. 3.

Next, presentation information calculating unit 103 determines whether the current communication quality acquired in step S1001 satisfies a predetermined communication quality (step S1004). It is assumed that a predetermined communication quality value (quality threshold) is previously provided in presentation information calculating unit 103. In the present example, it is assumed that the quality threshold is radio wave intensity "−100 dBm". Note that the value exhibited herein is one example only, and another value may be used. A current communication quality (in the present example, radio wave intensity) is "−103 dBm", and the quality threshold is "−100 dBm". Therefore, presentation information calculating unit 103 determines that the predetermined communication quality is not satisfied (No in step S1005).

In that case, presentation information calculating unit 103 determines whether to calculate information related to an action that improves a communication quality, based on the communication quality information generated in step S1002 and the action cost calculated in step S1003 (step S1006). Specifically, when a position satisfying the quality threshold and having an action cost less than or equal to a predetermined value (action cost threshold) exists, presentation information calculating unit 103 determines to calculate action information. In the present example, it is assumed that the action cost threshold is "300 m". Referring to the action second row in FIG. 3, the position "35.682748, 139.763736" satisfies the condition, and presentation information calculating unit 103 therefore determines to calculate action information (Yes in step S1007).

Next, presentation information calculating unit 103 calculates action information. In the present example, presentation information calculating unit 103 calculates, as action information, moving to the position "35.682748, 139.763736" with the action cost "160 m", and improving the current communication quality "−103 dBm" to "−91 dBm" (step S1008).

In that case, quality presenting unit 104 presents improvement quality information (step S1009). FIG. 4 is one example of improvement quality information presented in step S1009. Next, action presenting unit 105 determines whether a user of information presenting device 10 who has checked the improvement quality information performs a predetermined operation (step S1010). The predetermined operation is an operation preset to display detailed information related to action information.

When the predetermined operation is executed (Yes in step S1011), action presenting unit 105 displays details of action information (step S1012). FIG. 5 is an example of action information presented by action presenting unit 105 in step S1012. Note that, in the case of Yes in step S1005, No in step S1007, and No in step S1011, the following processing is not performed, and processing is ended.

As above, according to the first example embodiment, based on a current communication quality, a communication quality obtained by a predetermined action, and a cost of the action, information presenting device 10 separately presents action information related to the action in two stages. This enables information presenting device 10 to effectively present an action that improves a communication action to a user of the information presenting device.

For example, when almost no improvement of a communication quality can be obtained by a presented action, or when a communication quality can be improved but a cost of a presented action is high, it is considered that a user of the information presenting device does not adopt the presented action. In this instance, the presented action information is information unnecessary for a user. In such a case, information presenting device 10 can suppress the presentation of the information unnecessary for a user, by suppressing the presentation of the action information.

On the other hand, when a sufficient communication quality cannot be obtained currently, and a sufficient improvement of a communication quality can be obtained by a presented action having a low action cost, there is a high possibility that a user adopts the presented action. According to the first example embodiment, by presenting quality improvement information in such a case, information presenting device 10 can automatically present to a user that an action improving a communication quality exists. Moreover, presented quality improvement information can be displayed in a small region on the screen, and therefore does not prevent a user from using information presenting device 10 as an information processing device such as a smartphone. In addition, by performing a predetermined operation, a user who has checked the presented quality improvement information is able to know what specific action to take in detail.

Note that, although a movement distance is used as an action cost in the case described in the first example embodiment, information presenting device 10 may use another element as an action cost. For example, in addition to a movement distance, information presenting device 10 may use an index reflecting easiness of staying at a position to which a movement is made.

Furthermore, information presenting device 10 may include, for example, information that there is a place to sit down at a position of a movement destination, in the action information presented by action presenting unit 105. Presenting such detailed information related to an action improving a communication quality enables a user to determine with a high degree of accuracy whether to move.

Modification Example of First Example Embodiment

Although a movement from one place to another is described as a presented action in the first example embodiment, a presented action may be another action. Information presenting device 10 may present, for example, an action of suspending use of an application until a certain time. In that case, communication quality acquisition unit 101 acquires communication quality at a current time point (e.g., time) and one or more other time points. Then, action cost calculation unit 102 needs only to calculate a waiting time from the current time point to the one or more other time points as an action cost. In other words, information presenting device 10 uses a time of suspending use of an application as an action cost.

In this case, instead of displaying a movement route map in the right part of FIG. 5, action presenting unit 105 may display a clockface. The clockface indicates a current time by a black spot, and indicates, by a white spot, a time point of that improves a communication quality calculated by presentation information calculating unit 103.

A communication quality varies depending on time during one day, due to a change in a degree of congestion or the like even at the same position. Therefore, when an improvement of a communication quality can be expected by elapse of time, it becomes possible to use an application in a good state of a communication quality by suspending use of an application for a certain time. Presenting suspension of use of an application for a certain time enables a user to improve operation efficiency, by performing another operation (e.g., use of an application that does not perform communication, or the like) in this period, and resuming the use of the application after a communication quality is improved.

Alternatively, in this instance, information presenting device 10 may simultaneously present an application use of which is recommended. The application recommended by information presenting device 10 is an application which is small in communication amount, and a current communication quality of which satisfies a quality threshold of the application. This makes it possible to prevent a user of the information presenting device from using the application with a communication quality insufficient for the use of the application.

Herein, communication quality acquisition unit 101, action cost calculation unit 102, presentation information calculating unit 103, quality presenting unit 104, and action presenting unit 105 are consist of logic circuits and semiconductor storage devices.

Information presenting device 10 can also be achieved by computer device 40 including program 43.

Figure 11:
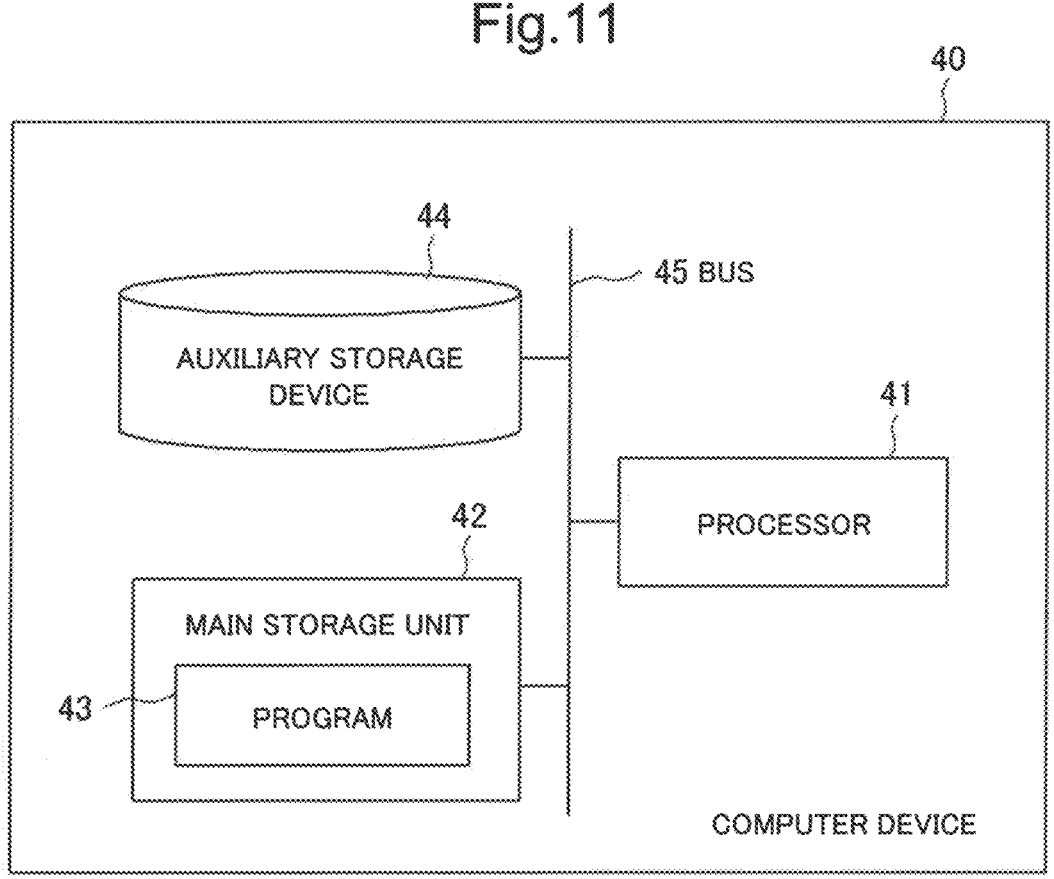
FIG. 11 is a diagram illustrating a configuration example of a computer device.

FIG. 11 is a configuration diagram of computer device 40. Computer device 40 includes processor 41, main storage unit 42, and auxiliary storage device 44 which are interconnected by bus 45. Herein, for example, main storage unit 42 is a semiconductor storage device, and auxiliary storage device 44 is a hard disk drive (HDD) or a solid state drive (SDD). Main storage unit 42 stores program 43.

Program 43 is executed in processor 41, and thereby causes processor 41 to function as communication quality acquisition unit 101, action cost calculation unit 102, presentation information calculating unit 103, quality presenting unit 104, or action presenting unit 105.

Second Example Embodiment

Next, a second example embodiment is described.

In the first example embodiment, information presenting device 10 first presents, to a user, an improvement amount of a communication quality by an action that improves a communication quality, and then presents details of the action that improves a communication quality when an interested user performs an operation. In the second example embodiment, information presenting device 11 presents a cost of an action, instead of an improvement amount of a communication quality, in a first stage of presentation.

There is a possibility that some users consider a cost of an action that improves a communication quality more important than an improvement amount of a communication quality, and thus determine whether to adopt presented action information. In the second example embodiment, information presenting device 11 first presents a cost of an action that improves a communication quality. This enables information presenting device 11 to more effectively present an action that improves a communication quality to a user who considers a cost of an action that improves a communication quality more important than an improvement amount of a communication quality, and thus determines whether to adopt presented action information.

Figure 7:
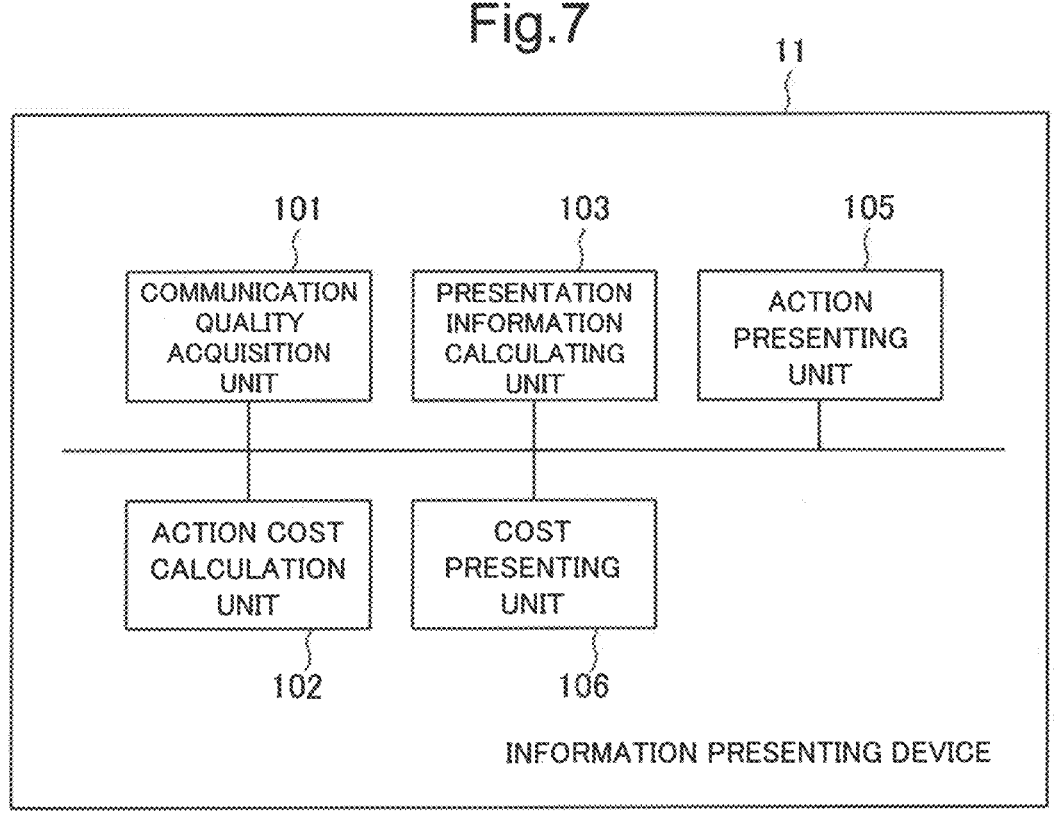
FIG. 7 is a diagram illustrating a configuration example of an information presenting device according to a second example embodiment of the present invention.

A configuration of information presenting device 11 according to the second example embodiment is described with reference to FIG. 7. Information presenting device 11 according to the second example embodiment includes communication quality acquisition unit 101, action cost calculation unit 102, presentation information calculating unit 103, cost presenting unit 106, and action presenting unit 105. Information presenting device 11 according to the second example embodiment is different from information presenting device 10 according to the first example embodiment in including cost presenting unit 106 instead of quality presenting unit 104. Note that, in the following description, components which are the same as or similar to those in the first example embodiment are given the same or similar reference signs, and detailed descriptions thereof are omitted.

Note that information presenting device 11 is a portable information processing device, and also includes a general component as a tablet terminal device, a smartphone, or a mobile phone. However, herein, a description thereof is omitted.

Figure 8A:
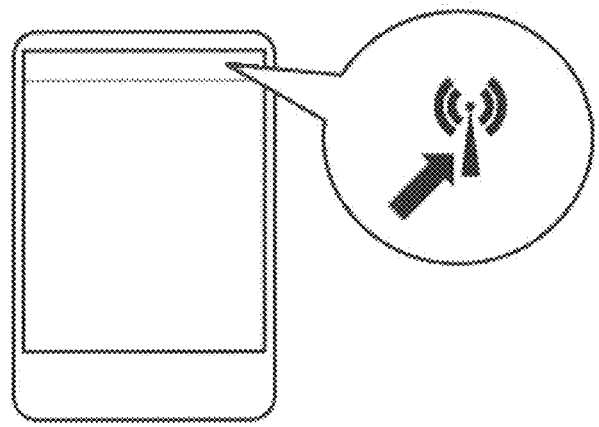
FIG. 8A is a view illustrating one example of an action cost presented by a cost presenting unit.
Figure 8B:
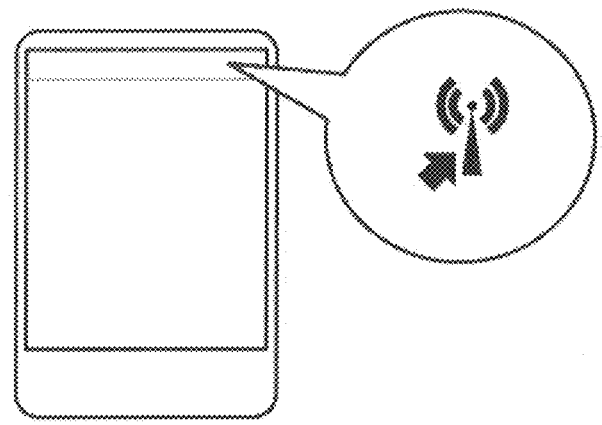
FIG. 8B is a view illustrating one example of an action cost presented by the cost presenting unit.

Cost presenting unit 106 presents a cost of an action that improves a communication action calculated by presentation information calculating unit 103. A cost of an action is, for example, a distance of a movement necessary to improve a communication quality. One example of an action cost presented by cost presenting unit 106 is illustrated in FIG. 8A and FIG. 8B. In the present example, whether a movement distance necessary to improve a communication quality is long or short is expressed by length of an arrow. For example, FIG. 8A illustrates that a movement distance is long (an action cost is high) because length of an arrow is long. FIG. 8B illustrates that a movement distance is short (an action cost is low) because length of an arrow is short.

Note that the example illustrated in FIG. 8A and FIG. 8B is one example only, and cost presenting unit 106 may represent an action cost by another method. For example, cost presenting unit 106 may represent an action cost by a numerical value. By using a numerical value, an action cost can be more specifically presented to a user of the information presenting device.

Information presented by cost presenting unit 106 is limited to an action cost, and can therefore be displayed in a small region on a screen, in a manner similar to quality information presented by quality presenting unit 104. This enables information presenting device 11 to present the existence of an action that improves a communication quality, and a cost of the action to a user, while hardly hiding contents already displayed on the screen.

Figure 9:
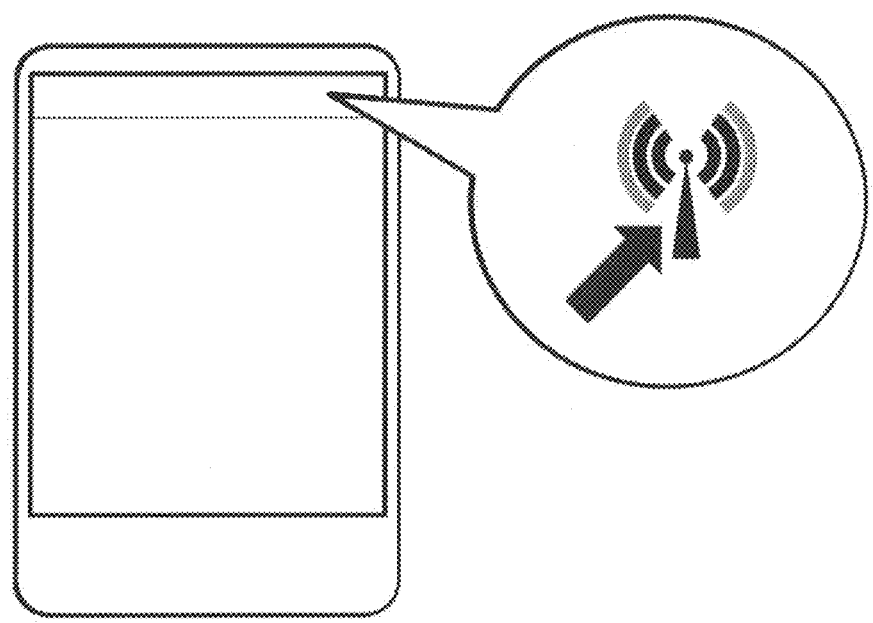
FIG. 9 is a view illustrating one example of an action cost and additional information presented by the cost presenting unit.

Note that cost presenting unit 106 may additionally present other information. For example, a communication quality improved by an action, which is calculated by presentation information calculating unit 103, may be additionally presented. One example is illustrated in FIG. 9. According to the example of FIG. 9, cost presenting unit 106 presents whether an action cost is high or low by length of an arrow, as in the example of FIG. 8A and FIG. 8B.

Furthermore, in the example of FIG. 9, cost presenting unit 106 presents a communication quality to be improved, by a picture of an antenna. Referring to FIG. 9, among pictures of three arcs indicating radio wave emitted from an antenna, the outermost arc is gray, and the inner two arcs are black. The picture in FIG. 9 presents an improvement of up to a second-stage communication quality among three stages of communication qualities. Thus, cost presenting unit 106 presents additional information. Thereby, it is possible to increase information for determination when a user of information presenting device 11 determines whether to refer to details of action information.

Figure 10:
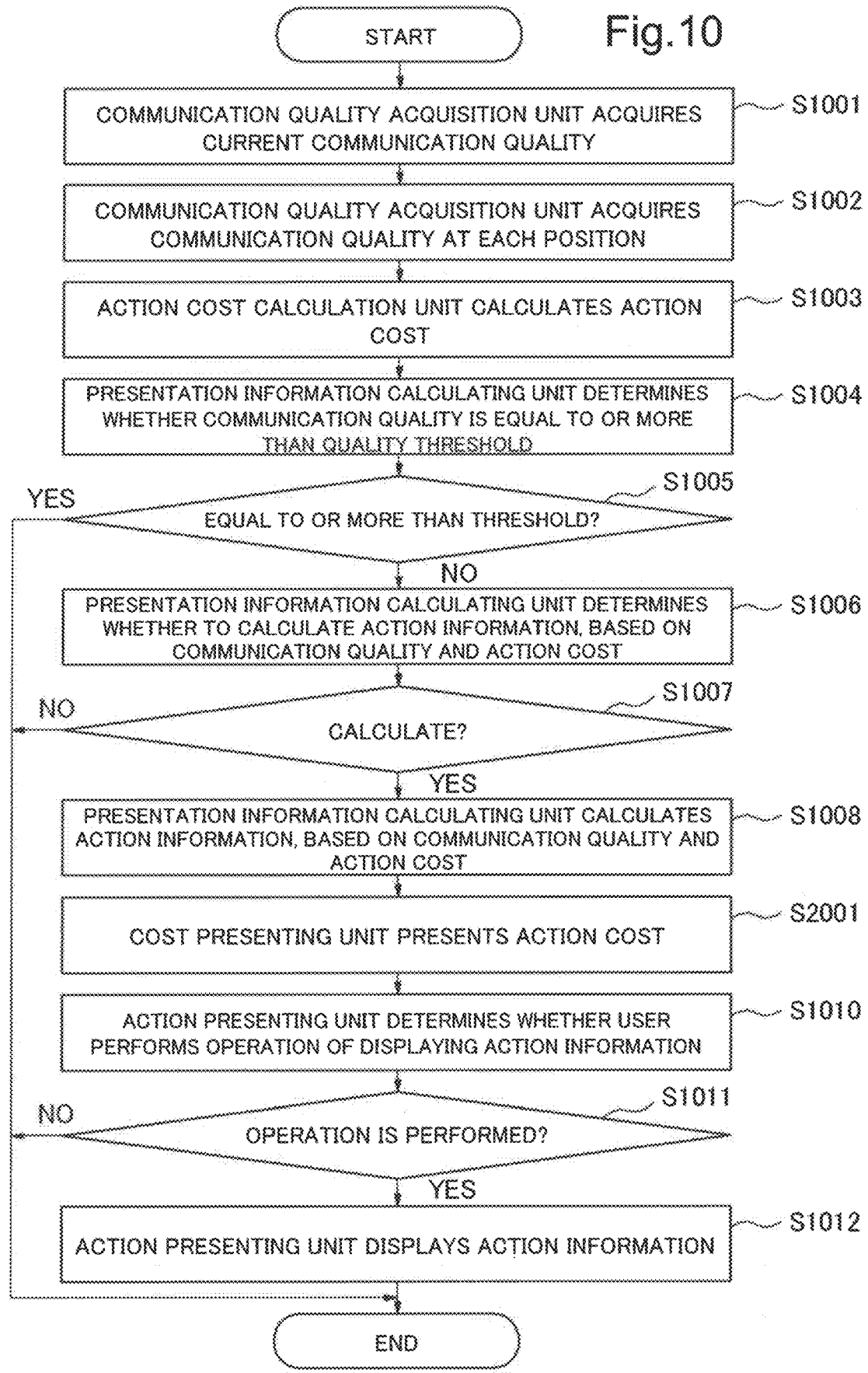
FIG. 10 is a flowchart illustrating an operation example of the information presenting device according to the second example embodiment of the present invention.

Next, an operation example of information presenting device 11 according to the second example embodiment is described in detail with reference to FIG. 10. Note that, in the following description, the same processing as that in the operation example according to the first example embodiment is given the same reference sign, and a detailed description thereof is omitted.

First, from the processing (step S1001) in which communication quality acquisition unit 101 acquires a current communication quality to the processing (step S1008) in which presentation information calculating unit 103 calculates presented action information, based on a communication quality and an action cost, the operation example according to the second example embodiment is similar to the operation example according to the first example embodiment.

Next, cost presenting unit 106 presents an action cost of an action that improves a communication quality calculated in step S1008 (step S2001). FIG. 8A and FIG. 8B illustrate an example of an action cost presented in step S2001. Note that details of FIG. 8A and FIG. 8B have been already described, and are therefore omitted herein. Thereafter, information presenting device 11 proceeds to step S1010, and processing therefrom is similar to that in the operation example according to the first example embodiment.

As above, information presenting device 11 according to the second example embodiment presents a cost of an action that improves a communication quality in a first presentation stage, and presents detailed information related to an action that improves a communication quality in a second presentation stage. There is a possibility that some users consider a cost of an action that improves a communication quality more important than an improvement amount of a communication quality, and thus determine whether to adopt presented action information. Information presenting device 11 according to the second example embodiment first presents a cost of an action that improves a communication quality. This enables information presenting device 11 to more effectively present an action that improves a communication quality to a user who considers a cost of an action that improves a communication quality more important than an improvement amount of a communication quality, and thus determines whether to adopt presented action information.

Modification Example of Second Example Embodiment

Although a movement from one place to another is described as a presented action in the second example embodiment, a presented action may be another action. In the second example embodiment, information presenting device 11 may present, for example, an action of suspending use of an application until a certain time, as in the modification example of the first example embodiment. In that case, cost presenting unit 106 may express whether a waiting time necessary to improve a communication quality is long or short by the length of the arrows in FIG. 8A and FIG. 8B.

Herein, communication quality acquisition unit 101, action cost calculation unit 102, presentation information calculating unit 103, action presenting unit 105, and cost presenting unit 106 are consist of logic circuits and semiconductor storage devices.

Furthermore, information presenting device 11 can also be achieved by computer device 40 in FIG. 11. In this case, program 43 in FIG. 11 is executed in processor 41, and thereby causes processor 41 to function as communication quality acquisition unit 101, action cost calculation unit 102, presentation information calculating unit 103, action presenting unit 105, or cost presenting unit 106.

Third Example Embodiment

Next, a third example embodiment of the present invention is described.

In the first example embodiment, information presenting device 10 presents, to a user, an improvement amount of a communication quality by an action that improves a communication quality in a first presentation stage. Thereafter, when an interested user performs an operation, information presenting device 11 presents details of the action that improves a communication quality in a second presentation stage. In the second example embodiment, information presenting device 11 presents a cost of an action instead of an improvement amount of a communication quality in a first presentation stage. The operation in the second presentation stage is the same as that in the first example embodiment.

The present invention also includes the third example embodiment described below, in addition to the two example embodiments described above.

Figure 12:
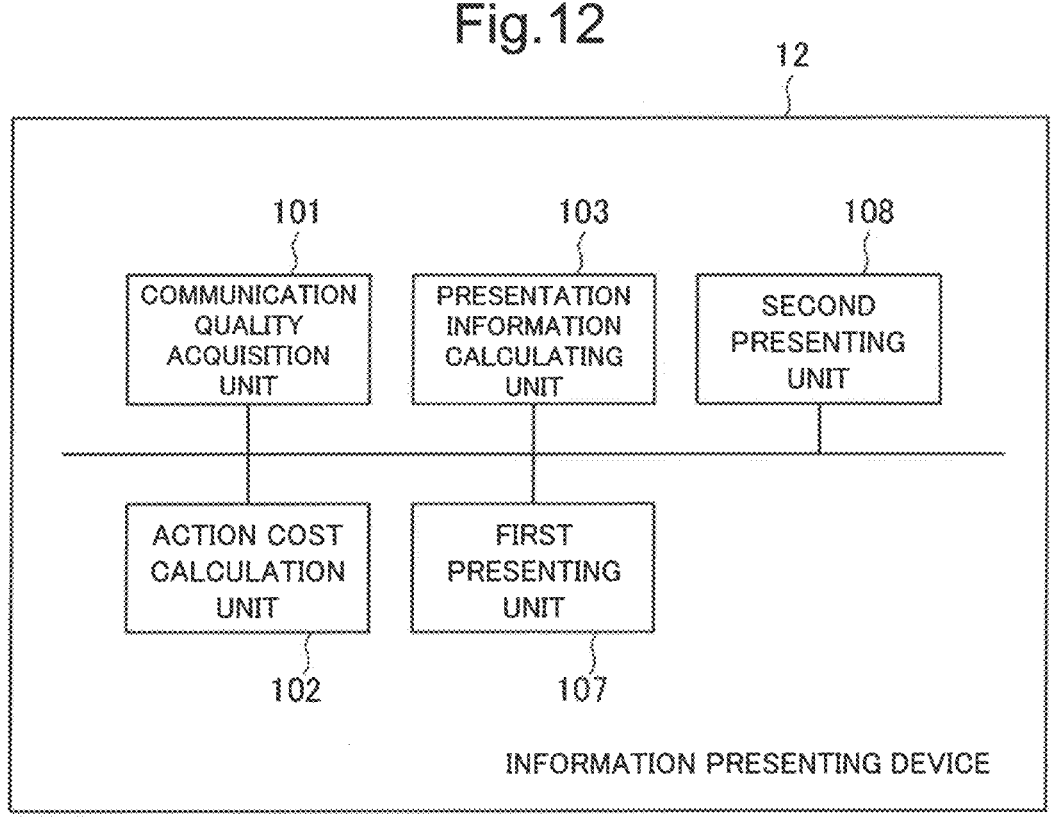
FIG. 12 is a block diagram illustrating a configuration example of an information presenting device according to a third example embodiment of the present invention.

FIG. 12 is a block diagram illustrating a configuration of information presenting device 12 according to the third example embodiment. Information presenting device 12 according to the third example embodiment is a portable information processing device, and includes communication quality acquisition unit 101, action cost calculation unit 102, presentation information calculating unit 103, first presenting unit 107, and second presenting unit 108.

Communication quality acquisition unit 101 acquires a current communication quality, and a communication quality when a user takes an action. Action cost calculation unit 102 calculates a cost of the action. Presentation information calculating unit 103 determines an action, based on the current communication quality, the communication quality when the action is taken, and the action cost.

First presenting unit 107 displays predetermined information when the action is taken. First presenting unit 107 is, for example, cost presenting unit 106 or quality presenting unit 104. Second presenting unit 108 acquires an instruction from a user after the display by first presenting unit 107, and then also displays additional information about a case where the action is taken, in addition to the predetermined information. Second presenting unit 108 is, for example, action presenting unit 105.

Information presenting device 12 which is a portable information processing device according to the present example embodiment can effectively present an action that improves a communication quality to a user.

The reason is that information related to a point to which a movement should be made in order to improve a communication quality is separately presented in two stages. A user becomes able to determine whether to accept an action that improves a communication quality, by basic information presented in the first stage. Then, only when accepting the action, the user becomes able to refer to additional information in the second stage.

While the invention of the present application has been described above with reference to the example embodiments, the invention of the present application is not limited to the example embodiments described above. Various alterations that can be appreciated by a person skilled in the art can be made to a configuration and details of the invention of the present application within the scope of the invention of the present application.

This application is based upon and claims the benefit of priority from Japanese Patent Application No. 2016-100411, filed on May 19, 2016, the disclosure of which is incorporated herein in its entirety by reference.

REFERENCE SIGNS LIST

10 Information presenting device
11 Information presenting device
40 Computer device
41 Processor
42 Main storage unit
43 Program
44 Auxiliary storage device
45 Bus
101 Communication quality acquisition unit
102 Action cost calculation unit
103 Presentation information calculating unit
104 Quality presenting unit
105 Action presenting unit
106 Cost presenting unit
107 First presenting unit
108 Second presenting unit

What is claimed is:

1. An information presenting device comprising:
at least one memory configured to store one or more instructions; and
at least one processor configured to execute the one or more instructions to:
acquire a current communication quality and a communication quality expected when and where a user takes an action of moving;
calculate an action cost, which is a moving distance of the user or a moving time of the user when the user moves, necessary for the action of moving;
determine the action of moving, based on the current communication quality, the communication quality expected when and where the user takes the action of moving, and the action cost;
display predetermined information about a case where the action of moving is taken; and
acquire an instruction from a user after display of the predetermined information, and then also display additional information about a case where the action of moving is taken, in addition to the predetermined information.

2. The information presenting device according to claim 1, wherein the at least one processor is further configured to execute the one or more instructions to:
acquire the communication quality at a current position and one or more other points after the moving,
acquire a movement cost being a distance from the current position to each of the one or more other points necessary for the moving,
select one point from the other points as a movement destination, based on the communication quality at the current position, the communication quality when moved from the current position to each of the one or more other points, and the movement cost from the current position to each of the one or more other points;
display the predetermined information related to the selected one point; and
acquire an instruction from a user after display of the predetermined information, and then also displays additional information for the one point, in addition to the predetermined information.

3. The information presenting device according to claim 2, wherein the at least one processor is further configured to execute the one or more instructions to:
display at least one of a change amount of the communication quality for the one point, and the movement cost for the one point, and
display position information of the one point, a change amount of the communication quality for the one point, and the movement cost for the one point.

4. The information presenting device according to claim 3, wherein the at least one processor is further configured to execute the one or more instructions to simultaneously displays the respective communication quality at the current position and the one point in different colors.

5. The information presenting device according to claim 4, wherein the at least one processor is further configured to execute the one or more instructions to display the respective communication quality at the current position and the one point, by changing a predetermined figure in number, length, or area, depending on levels of the communication quality.

6. The information presenting device according to claim 4, wherein the at least one processor is further configured to execute the one or more instructions to display the movement cost for the one point, by changing a predetermined figure in number, length, or area, depending on magnitude of the movement cost.

7. The information presenting device according to claim 4, wherein the at least one processor is further configured to execute the one or more instructions to display the communication quality at the one point, by changing a predetermined figure in number, length, or area, depending on a level the communication quality, and at a same time, displays the movement cost for the one point, by changing a figure being the same as or different from the predetermined figure in number, length, or area, depending on magnitude of the movement cost.

8. The information presenting device according to claim 3, wherein the at least one processor is further configured to execute the one or more instructions to display the respective communication quality at the current position and the one point, by changing a predetermined figure in number, length, or area, depending on levels of the communication quality.

9. The information presenting device according to claim 8, wherein the at least one processor is further configured to execute the one or more instructions to display the movement cost for the one point, by changing a predetermined figure in number, length, or area, depending on magnitude of the movement cost.

10. The information presenting device according to claim 8, wherein the at least one processor is further configured to execute the one or more instructions to display the communication quality at the one point, by changing a predetermined figure in number, length, or area, depending on a level the communication quality, and at a same time, displays the movement cost for the one point, by changing a figure being the same as or different from the predetermined figure in number, length, or area, depending on magnitude of the movement cost.

11. The information presenting device according to claim 3, wherein the processor is further configured to execute the one or more instructions to display the movement cost for the one point, by changing a predetermined figure in number, length, or area, depending on magnitude of the movement cost.

12. The information presenting device according to claim 11, wherein the at least one processor is further configured to execute the one or more instructions to display the communication quality at the one point, by changing a predetermined figure in number, length, or area, depending on a level the communication quality, and at a same time, displays the movement cost for the one point, by changing a figure being the same as or different from the predetermined figure in number, length, or area, depending on magnitude of the movement cost.

13. The information presenting device according to claim 3, wherein the processor is further configured to execute the one or more instructions to display the communication quality at the one point, by changing a predetermined figure in number, length, or area, depending on a level the communication quality, and at a same time, displays the movement cost for the one point, by changing a figure being the same as or different from the predetermined figure in number, length, or area, depending on magnitude of the movement cost.

14. An information presenting device comprising:
at least one memory configured to store one or more instructions; and
at least one processor configured to execute the one or more instructions to:
acquire a communication quality at a current time point and one or more other time points after suspending use of an application that uses communication when operating;
acquire a waiting time from the current time point to each of the one or more other time points,
select one time point from the one or more other time points, based on the communication quality at the current time point and the communication quality at each of the one or more other time points after waiting the waiting time;
display predetermined information related to the selected one time point; and
acquire an instruction from a user after display of the predetermined information, and then also displays additional information for the selected one time point, in addition to the predetermined information.

15. The information presenting device according to claim 14, wherein the at least one processor is further configured to execute the one or more instructions to display a recommended application for use during the waiting time.

16. The information presenting device according to claim 15, wherein the current communication quality satisfies a quality threshold of the recommended application.

17. An information presenting method comprising:
acquiring a current communication quality and a communication quality expected when and where a user takes an action of moving;
calculating an action cost, which is a moving distance of the user or a moving time of the user when the user moves, necessary for the action of moving;
determining the action of moving, based on the current communication quality, the communication quality expected when and where the user takes the action of moving, and the action cost;
displaying predetermined information about a case where the action of moving is taken; and
acquiring an instruction from a user after display of the predetermined information, and then also displaying additional information about a case where the action of moving is taken, in addition to the predetermined information.

18. A non-transitory computer readable storage medium storing an information presenting program causing a computer to:
acquire a current communication quality and a communication quality expected when and where a user takes an action of moving;
calculate an action cost, which is a moving distance of the user or a moving time of the user when the user moves, necessary for the action of moving;
determine the action of moving, based on the current communication quality, the communication quality expected when and where the user takes the action of moving, and the action cost;
display predetermined information about a case where the action of moving is taken; and
acquire an instruction from a user after display of the predetermined information, and then also display additional information about a case where the action of moving is taken, in addition to the predetermined information.

* * * * *